United States Patent
Tasaka et al.

(10) Patent No.: US 12,474,191 B2
(45) Date of Patent: Nov. 18, 2025

(54) ULTRASONIC PHYSICAL PROPERTIES MEASUREMENT DEVICE

(71) Applicant: NATIONAL UNIVERSITY CORPORATION HOKKAIDO UNIVERSITY, Sapporo (JP)

(72) Inventors: Yuji Tasaka, Sapporo (JP); Taiki Yoshida, Sapporo (JP); Kohei Ohie, Sapporo (JP)

(73) Assignee: NATIONAL UNIVERSITY CORPORATION HOKKAIDO UNIVERSITY, Sapporo (JP)

( * ) Notice: Subject to any disclaimer, the term of this patent is extended or adjusted under 35 U.S.C. 154(b) by 280 days.

(21) Appl. No.: 18/547,795

(22) PCT Filed: Feb. 24, 2022

(86) PCT No.: PCT/JP2022/007638
§ 371 (c)(1),
(2) Date: Aug. 24, 2023

(87) PCT Pub. No.: WO2022/181698
PCT Pub. Date: Sep. 1, 2022

(65) Prior Publication Data
US 2024/0133724 A1    Apr. 25, 2024
US 2024/0230385 A9    Jul. 11, 2024

(30) Foreign Application Priority Data
Feb. 25, 2021 (JP) ................... 2021-029219

(51) Int. Cl.
G01F 1/66    (2022.01)
(52) U.S. Cl.
CPC .................... *G01F 1/662* (2013.01)
(58) Field of Classification Search
CPC ................................ G01F 1/662
(Continued)

(56) References Cited

U.S. PATENT DOCUMENTS

| | | | | |
|---|---|---|---|---|
| 2008/0034844 A1* | 2/2008 | Manneville | ............ | G01N 11/10 73/54.23 |
| 2011/0130980 A1* | 6/2011 | Zozulya | ................ | G01N 11/16 702/54 |

FOREIGN PATENT DOCUMENTS

| | | | | |
|---|---|---|---|---|
| JP | 2003-344131 A | | 12/2003 | |
| WO | WO-2015138797 A1 * | | 9/2015 | ........... G01N 11/162 |

OTHER PUBLICATIONS

Murai et al., "Rheological evaluation of complex fluids using ultrasonic spinning rheometry in an open container", J. Rheol. 61, 537-549 (Year: 2017).*

(Continued)

*Primary Examiner* — Nathaniel T Woodward
(74) *Attorney, Agent, or Firm* — Muncy, Geissler, Olds & Lowe, P.C.

(57) ABSTRACT

[Problem] To provide an ultrasonic physical properties measurement device that suppresses the generation of a secondary flow inside a cylinder, is more portable, and can suppress changes in physical properties.
[Solution] An ultrasonic physical properties measurement device 1 that: uses ultrasonic waves to measure the flow velocity profile of fluids that flow inside a cylinder 2, by rotating the cylinder 2 backwards and forwards in a fixed cycle; and calculates the physical properties of fluid from the flow velocity profile. The cylinder 2: has an upper end surface 21 and lower end surface 22 that are penetrated such that fluid can flow therethrough; and comprises a rotation mechanism 3 that supports all or part of the cylinder 2 in a state of immersion in the fluid and rotates the cylinder 2 backwards and forwards.

4 Claims, 13 Drawing Sheets

(58) Field of Classification Search
USPC .................................................. 73/861.27
See application file for complete search history.

(56) References Cited

OTHER PUBLICATIONS

Taiki Yoshida, Yuji Tasaka and Yuichi Murai, "Rheological evaluation of complex fluids using ultrasonic spinning rheometry in an open container", The Society of Rheology, Inc. J.Rheol. 61(3), 537-549 May/Jun. 2017).

Youtube [online][video] Oct. 6, 2021, Internet <https://www.youtube.com/watch?v=0cMO-cmkF2c> 16:06 to 16:43, , "Development of Ultrasonic Spinning Rheometry Enabling Characterization of Complex Fluids" Yuji Tasaka, Associate Professor, Department of Mechanical and Aerospace Engineering, Graduate School of Engineering, Hokkaido University [this has been cited in the International Search Report of the corresponding International application No. PCT/JP2022/007638, and English translation of the ISR is submitted herewith.

* cited by examiner (a)

(b)

ULTRASONIC PHYSICAL PROPERTIES MEASUREMENT DEVICE

TECHNICAL FIELD

The present invention relates to an ultrasonic physical properties measurement device for measuring physical properties such as viscosity and elasticity of liquids.

BACKGROUND ART

In fields where liquid materials such as liquid foods, liquid materials, and chemicals are handled, it has been important to grasp physical properties such as viscosity and elasticity of liquid for product quality control, optimization of production processes, maintenance and inspection of factories and plants, etc. For example, in a food field, the physical properties change due to not only the mixing ratio of raw materials, but also the mixing state of each raw material, the temperature to be controlled, etc., which affects the taste and food texture of finished products. Therefore, monitoring and controlling changes in physical properties can greatly contribute to quality maintenance and quality improvement of finished products.

Conventionally, a rotational torque type physical properties measurement device has been known as a physical properties measurement device for liquid. In this rotational torque type physical properties measurement device, liquid to be measured is put in a container having an open top, and a rod-shaped or plate-shaped rotating body is immersed in the liquid and rotated to measure torque applied to the rotating body, thereby measuring the viscosity of the liquid. The measurement method is simple and easy to handle, and thus the device is widely used as a physical properties measurement device.

While being very effective for viscosity measurement of Newtonian fluids with constant viscosity that does not depend on shear rate (rotation speed), the rotational torque type physical properties measurement device cannot measure accurate physical properties for non-Newtonian fluids with viscosity that depends on shear rate because the torque received from the liquid changes depending on the rotation speed of the rotating body.

Liquid to be used for foods, liquid materials, and chemicals, etc. is often non-Newtonian fluids. In this respect, a spinning rheometer that employs a double disk is known as a physical properties device for non-Newtonian fluids. This spinning rheometer forms a thin layer of a test fluid between two discs, and rotates the discs relatively to each other. At this time, physical properties such as apparent viscosity and linear viscoelasticity are measured by assuming a flow velocity profile in the test fluid layer as Couette flow or the like.

However, the actual flow in the test fluid layer does not match the assumed flow velocity profile such as Couette flow, resulting in a difference between the assumed flow velocity profile and the actual flow velocity profile. In other words, the measurement of rheological properties by a spinning rheometer contains inaccuracy in principle caused by the assumption of the flow velocity profile.

Therefore, Yoshida, et al., who are the inventors of the present application, have proposed a method in which liquid is put in a cylindrical container, a flow velocity profile generated by reciprocatively rotating the cylindrical container forwards and backwards is measured by using ultrasonic waves, and the physical properties of the liquid in the rotating cylinder are calculated from the flow velocity profile (Non-Patent Literature 1). In other words, the method described in Non-Patent Literature 1 is a method for calculating the physical properties of liquid used for experiments by comparing theoretical values of the flow velocity profile obtained by calculation based on physical properties and the angular velocity, cycle, etc. of reciprocating rotation of the cylindrical container with experimental values of the flow velocity profile obtained by making an experiment under the same condition, and this method is an epoch-making method that does not require the assumption of the flow velocity profile in principle.

CITATION LIST

Non Patent Literature

Non Patent Literature 1: Taiki Yoshida, Yuji Tasaka and Yuichi murai, "Rheological evaluation of complex fluids using ultrasonic spinning rheometry in an open container", The Society of Rheology, Inc. J. Rheol. 61(3), 537-549 May/June(2017).

SUMMARY OF INVENTION

Technical Problem

By the way, the measurement accuracy of physical properties in the method described in Non-Patent Literature 1 depends in principle on the flow velocity profile measured by ultrasonic waves, and the flow in the cylindrical container is desired to have a theoretical flow velocity profile. In this respect, as will be shown in a comparative example to be described later, it has been confirmed that in a device using a conventional bottomed cylindrical container, a flow other than the flow caused by the cylindrical side wall, that is, a so-called secondary flow is generated. Therefore, in order to further improve measurement accuracy, development of a device capable of restraining the secondary flow has become an issue.

Further, the method described in Non-Patent Literature 1 is very useful as a method capable of measuring physical properties that do not require the assumption of flow velocity profile in principle, but conventional devices have been relatively large in size and difficult to be moved and carried. Therefore, there is a growing need for portable devices that can be moved and carried.

Furthermore, when a cylindrical container with a bottom is used, it is necessary to transfer and put the liquid to be measured from a storage tank or production pipeline into the cylindrical container as in the case of the rotating torque type physical properties measurement device, and there is a concern that the physical properties change due to changes in temperature and the surrounding environment.

An object of the present invention, which has been made to solve the foregoing problems, is to provide an ultrasonic physical properties measurement device that can restrain occurrence of a secondary flow in a cylinder and enable portability, thereby restraining changes in physical properties.

Solution to Problem

In order to solve a problem of restraining a secondary flow caused by an upper end plane and a lower end plane of a cylinder that reciprocatively rotates forwards and backwards, and enabling portability, an ultrasonic physical properties measurement device according to the present invention measures a flow velocity profile of a liquid flowing in a cylinder using ultrasonic waves by reciprocatively rotating the cylinder forwards and backwards in a constant cycle and calculates physical properties of the liquid from the flow velocity profile, wherein an upper end plane and a lower end plane of the cylinder are perforated such that the liquid can flow therethrough, and the ultrasonic physical properties measurement device comprises a rotating mechanism for supporting the cylinder and reciprocatively rotating the cylinder forwards and backwards while a part or all of the cylinder is immersed in the liquid.

Further, as an aspect of the present invention, in order to solve a problem of providing a support portion for the cylinder that is capable of restraining a secondary flow while rotating the cylinder, the upper end plane and the lower end plane of the cylinder may be fully open, and the rotating mechanism may include a rotating shaft to be pivotally supported by a power unit above an axial center of the cylinder as a support unit for supporting the cylinder, a hub fixed to a lower end portion of the rotating shaft, and a plurality of spokes that extend radially from the hub and are fixed to an upper edge portion of the cylinder.

Further, as an aspect of the present invention, in order to solve a problem of restraining the influence on the flow velocity profile in the cylinder due to forward-and-backward reciprocating rotation by dispersing a flow generated by each rotating spoke into a flow in a radial direction and a flow in a circumferential direction, each of the spokes may have a base end at a position that is horizontally displaced from a position of the axial center by a predetermined distance, and extend in a direction which is horizontal to a line connecting the axial center and the base end and bent at a predetermined angle with respect to the line.

Further, as an aspect of the present invention, in order to enhance the measurement accuracy of the flow velocity profile in the vicinity of a wall surface of the cylinder, an ultrasonic transducer for radiating ultrasonic waves to an inside of the cylinder and receiving ultrasonic waves reflected from the inside of the cylinder may be fixed to an outer side surface of the cylinder so as to be rotatable integrally with the cylinder.

Advantageous Effect of Invention

According to the present invention, it is possible to restrain occurrence of a secondary flow in a cylinder, and achieve portability, thereby restraining changes in physical properties.

DESCRIPTION OF EMBODIMENTS

An embodiment of an ultrasonic physical properties measurement device according to the present invention will be described below with reference to the drawings.

Figure 1:
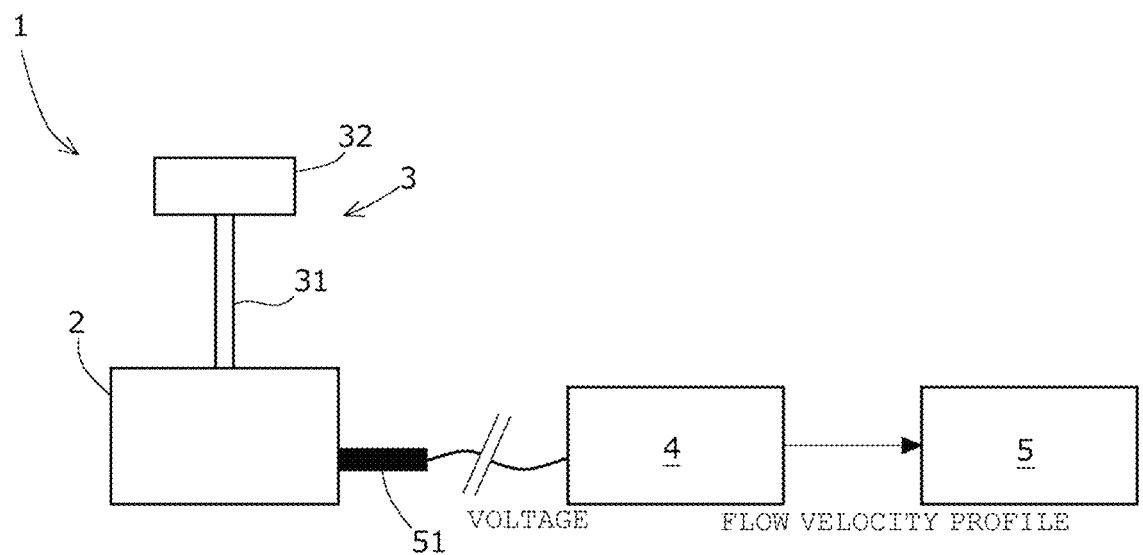
FIG. 1 is a block diagram showing an embodiment of an ultrasonic physical properties measurement device according to the present invention.

As shown in FIG. 1, the ultrasonic physical properties measurement device 1 of the present embodiment includes a cylinder 2, a rotating mechanism 3 that supports the cylinder 2 and reciprocatively rotates the cylinder 2 forwards and backwards, ultrasonic flow velocity profile measurement means 4 for measuring a flow velocity profile of liquid in the cylinder 2, and physical properties calculation means 5 for calculating the physical properties of the liquid from the flow velocity profile measured by the ultrasonic flow velocity profile measurement means 4. Each configuration will be described below.

Figure 2:
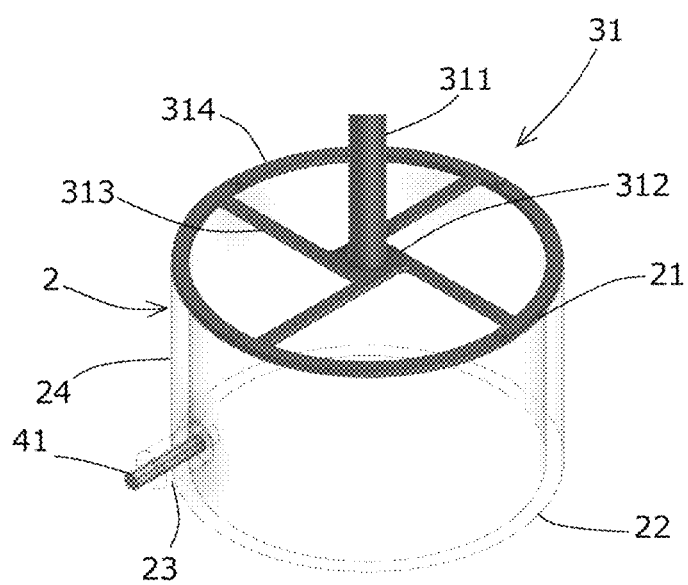
FIG. 2 is a perspective view showing a cylinder, a support portion, and an ultrasonic transducer in the present embodiment.

The cylinder 2 is used to apply a shearing force from a cylindrical side wall to the liquid by reciprocatively rotating forwards and backwards, thereby causing the liquid inside the cylinder 2 to flow. As shown in FIG. 2, an upper end plane 21 and a lower end plane 22 of the cylinder 2 are perforated such that fluid can flow therethrough. In other words, the cylinder 2 is configured such that liquid can flow into and out of the cylinder 2 through the perforated upper and lower end planes 21 and 22 when the cylinder 2 is immersed in the liquid, and restrains occurrence of a secondary flow by enabling the flow of the liquid when the cylinder 2 reciprocatively rotates forwards and backwards.

Figure 3:
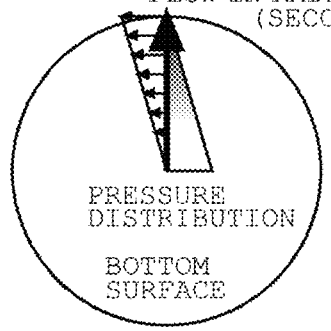
FIG. 3 is a schematic diagram showing a secondary flow generated by a disk serving as a bottom when a bottomed cylinder is rotated.
Figure 3:
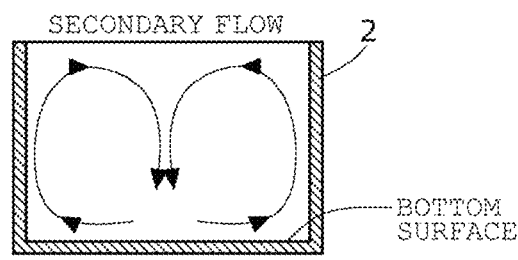

The secondary flow in the present embodiment is flows other than a flow in the peripheral direction (circumferential direction) of the cylinder which is caused by the cylindrical side wall when the cylinder 2 reciprocatively rotates forwards and backwards, and as shown in FIG. 3, the secondary flow includes a radial flow (flow in the radial direction) directing from the axial center to the cylindrical side wall, and a circulating flow associated with the flow in the radial direction. In other words, when a bottom surface is provided on the lower end plane 22 of the cylinder 2, as shown in FIG. 3(a), the velocity of the liquid in the vicinity of the cylindrical side wall is higher than the velocity of the liquid in the vicinity of the axial center of the bottom surface. The liquid in the vicinity of the bottom surface is pulled and caused to flow by shear force with the bottom surface. At this time, a difference in flow velocity occurs between the liquid in the vicinity of the axial center and the liquid in the vicinity of the cylindrical side wall. The fluid has a property that the pressure decreases as the flow velocity increases, and thus the pressure in the vicinity of the cylindrical side wall is lower than that in the vicinity of the axial center due to the difference in flow velocity. Since the liquid flows from a higher pressure side to a lower pressure side, a radial flow directing from the axial center to the cylindrical side wall occurs. Further, due to this radial flow, as shown in FIG. 3(b), a circulating flow that circulates so as to flow in whirls inside the cylinder 2 is generated, and a doughnut-shaped secondary flow is generated in the entire cylinder.

In order to prevent such a secondary flow from occurring, the upper end plane 21 and the lower end plane 22 of the cylinder 2 are fully open in the present embodiment, and each end plane is configured by only the thickness of the cylindrical side wall.

Figure 4:
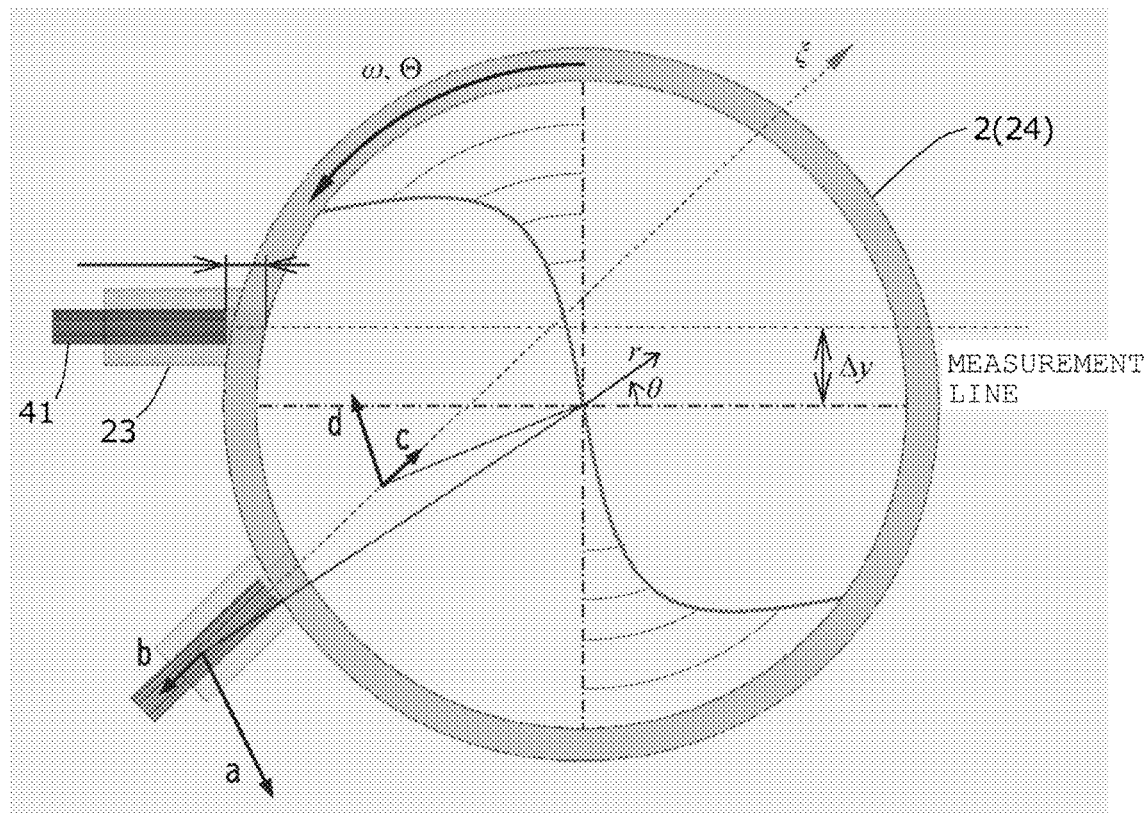
FIG. 4 is a schematic diagram showing the positional relationship between the cylinder and the ultrasonic transducer rotating integrally with the cylinder in the present embodiment.

Further, as shown in FIG. 2, a transducer fixing portion 23 for fixing an ultrasonic transducer 41 that transmits and receives ultrasonic waves in the ultrasonic flow velocity profile measurement means 4 is formed in the cylinder 2 of the present embodiment. Specifically, the transducer fixing portion 23 is provided on the outer side surface 24 of the cylinder 2, and is formed in a cylindrical shape having an inner diameter that allows the ultrasonic transducer 41 having a cylindrical-rod shape to be fitted therein. As shown in FIG. 4, the transducer fixing portion 23 is provided such that an ultrasonic measurement line (irradiation line) $\xi$ from the ultrasonic transducer 41 passes through a position at a distance $\Delta y$ from the axial center of the cylinder 2.

Figure 6:
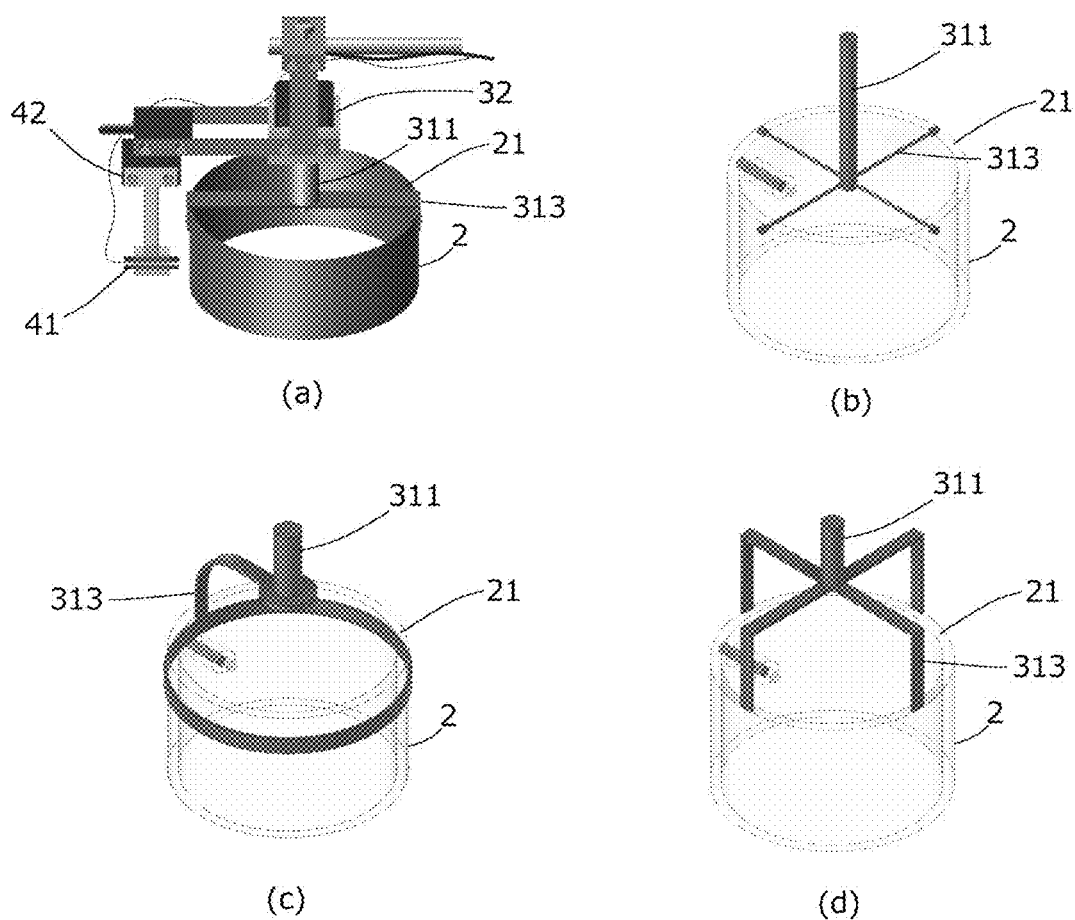
FIG. 6 is a perspective view showing a support portion for a cylinder and a rotating mechanism in another embodiment.

Note that the support of the ultrasonic transducer 41 is not limited to a configuration in which the ultrasonic transducer 41 can be rotated integrally with the cylinder 2, but it may be supported by a support arm 42 fixed to a non-rotating portion such as a power unit 32 as shown in FIG. 6(a).

The rotating mechanism 3 is used to reciprocatively rotate the cylinder 2 forwards and backwards, and includes a support portion 31 for supporting the cylinder 2, and a power unit 32 for reciprocatively rotating the cylinder supported by the support portion 31 forwards and backwards.

The support portion 31 is used to support the cylinder 2 while a part or all of the cylinder 2 is immersed in the liquid. As shown in FIG. 2, the support portion 31 in the present embodiment is configured to support the cylinder 2 while suspending the cylinder 2 downward, and includes a rotating shaft 311, a hub 312 fixed to the lower end portion of the rotating shaft 311, a plurality of spokes 313 extending from the hub 312, and a fixing ring 314 for fixing the tip of each spoke 313 to an upper edge portion of the cylinder 2.

The rotating shaft 311 supports the cylinder 2 above its axial center so that a part or all of the cylinder 2 can be immersed in the liquid, and transmits the rotational force of the power unit 32 to the cylinder 2. The rotating shaft 311 in the present embodiment is pivotally supported by the power unit 32 as shown in FIG. 1. Since this rotating shaft 311 does not measure torque unlike the rotational torque type physical properties measurement device, the length thereof, the depth of the immersion in the liquid, etc. can be freely selected.

The hub 312 is used to connect the rotating shaft 311 and the spokes 313. The hub 312 in the present embodiment is formed in a substantially square shape so that the spokes 313 can extend from the four corners. A connecting hole 315 for connecting the rotating shaft 311 is formed in the center of the hub 312.

Note that the rotating shaft 311 and the hub 312 are not limited to a configuration in which they are provided as separate bodies as in the present embodiment, and as shown in FIG. 6(b), they may be configured integrally such that the lower end portion of the rotating shaft 311 functions as the hub 312.

Figure 5:
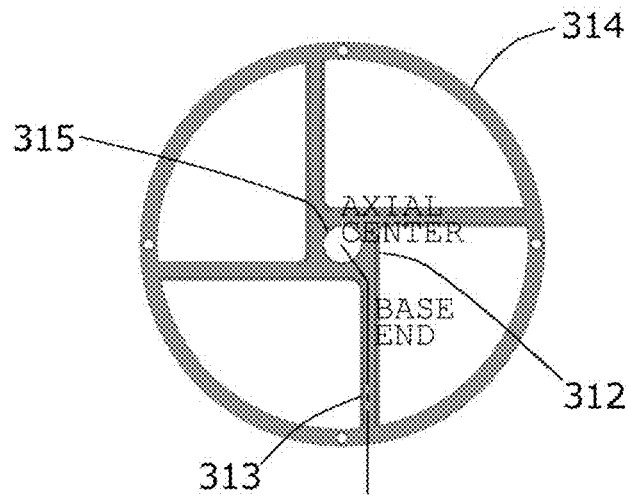
FIG. 5 is a plan view showing a hub, spokes, and a fixing ring in the embodiment.

The spokes 313 are used to connect the hub 312 and the cylinder 2, and extend radially from the hub 312. The spokes 313 in the present embodiment are obliquely provided so that the secondary flow in the radial direction caused by the spokes 313 can be dispersed in the circumferential direction. Specifically, as shown in FIG. 5, when positions which correspond to four corners of the hub 312 and are displaced horizontally from the axial center position by a predetermined distance are set as base ends, the spokes 313 extend in directions which are respectively horizontal to lines connecting the axial center and the base ends and bent at a predetermined angle with respect to the lines.

The tips of the spokes 313 are fixed to the fixing ring 314, and fixed to an upper edge portion 25 of the cylinder 2 via the fixing ring 314.

The upper edge portion of the cylinder 2 to which the tips of the spokes 312 are fixed include not only the upper end plane 21 of the cylinder 2, but also positions that do not interfere with the measurement of the flow velocity profile using ultrasonic waves. Therefore, the upper edge includes an inner peripheral surface in the vicinity of the upper end plane 21 of the cylinder 2 as shown in FIG. 6(b), and an outer side surface 24 in the vicinity of the upper end plane 21 as shown in FIG. 6(c).

The fixing of the spokes 313 is not limited to a configuration in which they are fixed to the upper end portion via the fixing ring 314, but they may be directly fixed to the cylinder 2 without being fixed via the fixing ring 314 as shown in FIG. 6(b). Further, the spokes 313 may be bent vertically as shown in FIG. 6(d).

The power unit 32 is a power source for reciprocatively rotating the cylinder 2 forwards and backwards in a constant cycle f within a preset predetermined angle range Θ, and in the present embodiment, it is configured by an electric stepping motor that can control the rotation speed and the angle range Θ. Note that the power unit 32 is not limited to an electric stepping motor, and can be appropriately selected from various electric motors, and it may be provided with a gear mechanism or the like as necessary.

The ultrasonic flow velocity profile measurement means 4 includes the ultrasonic transducer 41 that irradiates ultrasonic waves from the outside of the cylinder 2 into the cylinder 2 and receives ultrasonic waves reflected from the inside of the cylinder 2 to the outside of the cylinder 2, and analyzes the received ultrasonic waves to measure the flow velocity at a plurality of measurement points along a measurement line ξ of the ultrasonic waves in time series. In other words, the ultrasonic flow velocity profile measurement means 4 can measure a spatiotemporal flow velocity profile $u_ξ(ξ,t)$ on the measurement line ξ at time t.

The ultrasonic transducer 41 includes a small element that operates upon application of a voltage thereto, and by applying a voltage oscillating at a constant period, the element can vibrate and emit substantially linear ultrasonic waves along the measurement line ξ. Further, when the element vibrates due to reflected waves, it generates a voltage corresponding to the vibration, whereby the element can receive the reflected waves. The ultrasonic transducer 41 in the present embodiment is inserted into and fixed to the transducer fixing portion 23 provided on the outer side surface 24 of the cylinder 2 so that it can rotate integrally with the cylinder 2. At this time, in order to restrain the influence of diffused reflection of ultrasonic waves in the wall of the cylinder 2, etc., it is preferable that the ultrasonic transducer 41 is arranged to be spaced from the inner side surface of the cylinder 2 such that the distance from the inner side surface of the cylinder 2 to the tip of the ultrasonic transducer 41 is approximately equal to the diameter of the ultrasonic transducer 41, and in the present embodiment, the ultrasonic transducer 41 may be integrated with the cylinder 2 and set in advance.

The ultrasonic flow velocity profile measurement means 4 is configured by a computer capable of executing arithmetic processing, a program for executing arithmetic processing, and the like, and it converts a voltage based on reflected waves received by the ultrasonic transducer 41 into a digital signal that can be arithmetically processed, and performs arithmetic processing on the digital signal, whereby the spatiotemporal flow velocity profile $u_ξ(ξ,t)$ can be calculated. As for a technique for calculating the spatiotemporal flow velocity profile $u_ξ(ξ,t)$, for example, a technique disclosed in Japanese Patent Laid-Open No. 2003-344131 can be used.

Physical properties calculation means 5 is configured by a computer capable of performing arithmetic processing and a program for executing arithmetic processing, etc., and it can calculate the physical properties of the liquid from the flow velocity profile measured by the ultrasonic flow velocity profile measurement means 4. The physical properties calculation means 5 in the present embodiment is connected to the ultrasonic flow velocity profile measurement means 4 so as to be capable of communicating with the ultrasonic flow velocity profile measurement means 4, and is configured to be capable of receiving data of the flow velocity profile measured by the ultrasonic flow velocity profile measurement means 4.

Further, the physical properties calculation means 5 in the present embodiment has the ultrasonic transducer 41 which is fixed to the outer side surface 24 of the cylinder 2 and rotated integrally to measure a time-series flow velocity profile $u_ξ(ξ,t)$ along a measurement line ξ, and converts the measured time-series flow velocity profile $u_ξ(ξ,t)$ into a circumferential flow velocity profile $u_θ(r,t)$ in the cylinder 2.

First, the speed in the circumferential direction of the ultrasonic transducer 41 is represented by the following expression (1).

$$U_{wall}(r,t) = \omega R \Theta e^{-\omega t} \quad \text{Expression (1)}$$

Here, r represents the distance in the radial direction from the axial center, ω represents angular velocity, Θ represents an angle range of rotation, and t represents time.

The speed of the ultrasonic transducer 41 in a direction along the measurement line of ultrasonic waves is represented by the following expression (2).

$$U(ξ,t) = \omega \Theta \Delta y e^{-\omega t} \quad \text{Expression (2)}$$

Here, Δy represents the distance from the axial center.

When the flow velocity profile $u_ξ(ξ,t)$ along the measurement line ξ measured by the ultrasonic flow velocity profile measurement means 4 are converted into a circumferential flow velocity profile along the radial direction based on the above expressions (1) and (2), the flow velocity profile of the following expression (3) is obtained.

$$u_θ(r, t) = \frac{r}{\Delta y}(u_ξ - \omega \Theta \Delta y e^{-\omega t}) \quad \text{Expression (3)}$$

The physical properties calculation means 5 in the present embodiment compares the circumferential flow velocity profile $u_θ(r,t)$ calculated by Expression (3) with a theoretically obtained flow velocity profile to calculate the physical properties of the liquid. A technique disclosed in Non-Patent Literature 1 can be used as a method for calculating the physical properties from the circumferential flow velocity profile $u_θ(r,t)$ in the physical properties calculation means 5.

Note that the ultrasonic flow velocity profile measurement means 4 and the physical properties calculation means 5 in the present embodiment are configured as separate bodies, but they may be configured by the same computer.

Next, the action of each configuration in the ultrasonic physical properties measurement device 1 of the present embodiment will be described.

Figure 7:
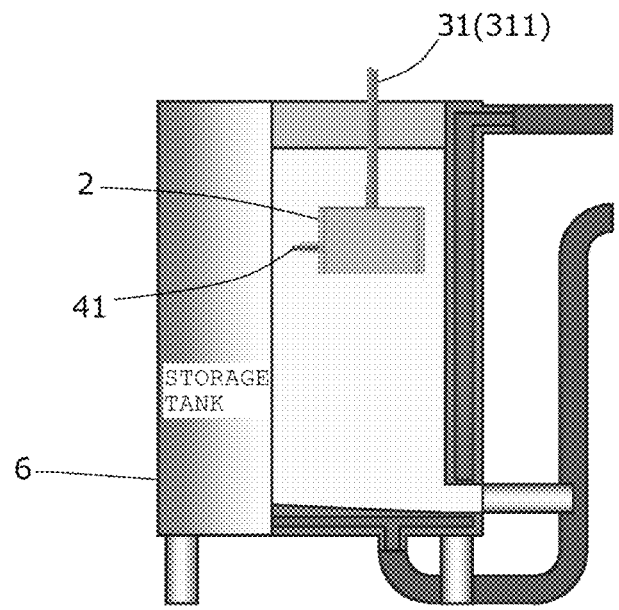
FIG. 7 is a schematic diagram showing a state in which the cylinder and the rotating mechanism in the present embodiment are set in a storage tank in which liquid to be measured is stored.

First, the liquid is caused to flow by reciprocatively rotating the cylinder 2 forwards and backwards in a constant cycle. Specifically, a part or all of the cylinder 2 supported by the support portion 31 of the rotating mechanism 3 is immersed in the liquid. For example, as shown in FIG. 7, the cylinder 2 and the rotating mechanism 3 are transferred to a storage tank 6 in which the liquid to be measured is stored, and set from the upper side of the storage tank 6 into the storage tank 6 in order for the cylinder 2 to be immersed at arbitrary depth and position in the liquid.

Since both the upper end plane 21 and the lower end plane 22 of the cylinder 2 are perforated so as to allow the liquid to flow therethrough, the liquid flows into the cylinder 2 by merely submerging the cylinder 2 in the liquid. Since the ultrasonic physical properties measurement device 1 of the present embodiment is not a device for measuring torque like the conventional rotational torque type physical properties measurement device, it is possible to freely select the length of the rotating shaft 311, and arrange the cylinder 2 at desired depth and position. Here, by immersing the entire portion of the cylinder 2, it is possible to restrain or eliminate the influence of fluctuation in the free interface on the upper end plane side. Further, only the cylinder 2 and the rotating mechanism 3 may be set in the storage tank 6. In the present embodiment, the ultrasonic transducer 41 is fixed to the cylinder 2 in advance, so that setting is easy and portability is good.

Next, the power unit 32 of the rotating mechanism 3 causes the cylinder 2 to reciprocatively rotate forwards and backwards in a constant cycle. The liquid in the cylinder 2 flows due to shear force with the cylindrical side wall caused by viscosity. At this time, the lower end plane 22 of the cylinder 2 is fully open, and no secondary flow occurs. Moreover, since the rotating shaft 311 is arranged above the cylinder 2, it does not affect generation of the secondary flow.

Further, since the hub 312 and the spokes 313 are formed on the upper end plane of the cylinder 2 so that the liquid can flow therethrough, it is possible to more greatly restrain occurrence of the secondary flow as compared with the conventional bottomed cylindrical container having the entirely covered bottom surface.

Figure 8:
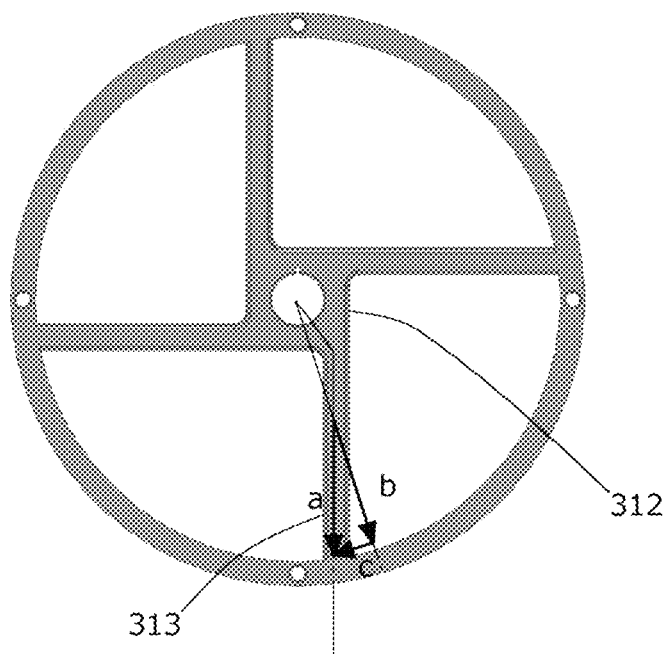
FIG. 8 is a schematic diagram showing a bent state of the spokes and an accompanying secondary flow in the present embodiment.

Further, the secondary flow generated by each spoke 313 in the present embodiment occurs along each spoke 313, and thus the secondary flow is dispersed not only in the radial direction, but also in the circumferential direction. In other words, as shown in FIG. 8, when the spokes 313 are bent so as not to be arranged on diagonal lines passing through the axial center, a flow a along the spokes 313 is also dispersed into a radial flow b and a circumferential flow c, so that occurrence of the secondary flow can be restrained.

The ultrasonic flow velocity profile measurement means 4 emits ultrasonic waves to the inside of the cylinder 2 by means of the ultrasonic transducer 41, and receives ultrasonic waves reflected from the inside of the cylinder 2 to measure the flow velocity at a plurality of measurement points along a measurement line $\xi$ of the ultrasonic waves in time series. Specifically, as shown in FIG. 1, a voltage for generating ultrasonic waves is applied from the ultrasonic flow velocity profile measurement means 4 to the ultrasonic transducer 41. On the other hand, the ultrasonic transducer 41 receives ultrasonic waves reflected from the inside of the cylinder 2, and transmits a voltage generated in response to the reflected waves to the ultrasonic flow velocity profile measurement means 4. The ultrasonic flow velocity profile measurement means 4 converts the voltage received from the ultrasonic transducer 41 into the digital signal, and performs arithmetic processing on the digital signal to calculate a spatiotemporal flow velocity profile $u_\xi(\xi,t)$ of the liquid in the cylinder 2, which has been caused to flow by reciprocatively rotating the cylinder 2 forwards and backwards in a constant cycle. Then, the calculated flow velocity profile $u_\xi(\xi,t)$ is transmitted to the physical properties calculation means 5.

At this time, since the ultrasonic transducer 41 is integrally fixed to the outer side surface 24 of the cylinder 2 at an optimized position in advance, the setting thereof is easy, and it is possible to reduce an error in each measurement.

The physical properties calculation means 5 receives the flow velocity profile $u_\xi(\xi,t)$ transmitted from the ultrasonic flow velocity profile measurement means 4. Then, it converts the flow velocity profile $u_\xi(\xi,t)$ into a flow velocity profile $u_\theta(r,t)$ in the circumferential direction based on Expression (3). The flow velocity profile $u_\theta(r,t)$ in the circumferential direction is compared with a theoretically obtained flow velocity profile (a flow velocity profile in the same circumferential direction as that of the measured values) to calculate the physical properties.

According to the ultrasonic physical properties measurement device 1 of the present embodiment as described above, the following effects can be obtained.

1. Both the upper end plane 21 and the lower end plane 22 of the cylinder 2 are configured so as to allow liquid to flow therethrough, whereby liquid which reciprocatively rotates forwards and backwards can flow therethrough, and occurrence of a secondary flow can be restrained.
2. Both the upper end plane 21 and the lower end plane 22 of the cylinder 2 are configured so as to allow liquid to flow therethrough, whereby liquid is allowed to flow into the cylinder 2 by merely submerging the cylinder 2 in the liquid stored in the storage tank 6 or the like, and the setting can be easily performed. In addition, it is possible to restrain changes in physical properties without the need to transfer to another container or the like.
3. Since the length of the rotating shaft 311 can be freely selected, when the physical properties of the liquid stored in the storage tank 6 or the like are measured, it is possible to measure the difference in physical properties caused by the difference in depth or the difference in position.
4. The support portion 31 for supporting the cylinder 2 is configured by the rotating shaft 311, the hub 312 and the spokes 313, whereby the cylinder 2 can be supported so as to be reciprocatively rotatable forwards and backwards while ensuring the flow of liquid therethrough.
5. The spokes 313 are bent at a predetermined angle, whereby the secondary flow generated along the spokes 313 can be dispersed in the radial direction and in the circumferential direction.
6. The ultrasonic transducer 41 is fixed in advance so as to be rotatable integrally with the cylindrical body 2, and both the upper end plane 21 and the lower end plane 22 of the cylinder 2 are perforated so as to allow liquid to flow therethrough, whereby the setting is easily performed, and portability is enhanced. In addition, the measurement accuracy of the flow velocity profile of liquid and a measurable spatial and velocity range can be expanded, so that the physical properties of liquids having various rheological properties can be measured.

Next, specific examples of the ultrasonic physical properties measurement device according to the present invention will be described. Note that the technical scope of the present invention is not limited to the features shown by the following example.

COMPARATIVE EXAMPLE

<Secondary Flow Generated by Conventional Method Disclosed in Non-Patent Literature 1>

Figure 9:
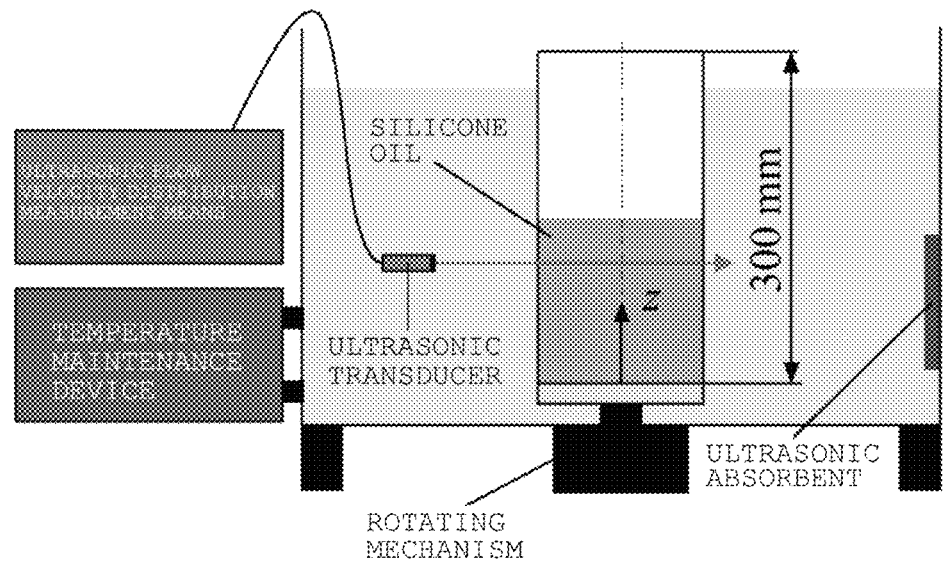
FIG. 9 is a schematic diagram showing a device (conventional device) which is fabricated in a comparative example, and measures a flow velocity profile of liquid flowing in a cylinder using ultrasonic waves according to a conventional method.

In this comparative example, a secondary flow generated when the conventional method disclosed in Non-Patent Literature is used 1 will be described. As shown in FIG. 9, the conventional method used a test device (hereinafter referred to as "conventional device") in which a bottomed cylindrical container was reciprocatively rotated forwards and backwards in a constant cycle. The cylindrical container was made of acrylic material, and had a thickness of 3 mm, a radius R of 77 mm, and a depth of 300 mm.

Further, the cylindrical container is placed in a container that is one size larger, and the circumference of the cylindrical container is filled with water so that the ultrasonic waves from the ultrasonic transducer can be radiated to the inside of the cylindrical container. A rotating mechanism is provided below the cylindrical container.

Liquid to be measured is silicone oil having a kinematic viscosity of 1000 mm$^2$/s. This silicone oil is a Newtonian fluid independent of shear rate. Microparticles (Mitsubishi Chemical Corporation, CHP20P, 75-150 μm in diameter, specific gravity 1.03 with respect to silicone oil) are suspended as reflectors in the silicone oil in order to improve reflection of ultrasonic waves. The silicone oil was filled so that a liquid surface is formed at the height z=125 mm from the bottom surface of the cylindrical container.

The cylindrical container filled with this silicone oil was rotated forward and backward at 1 Hz with an angular range Θ of 90 degrees (π/2 rad).

The ultrasonic transducer has a frequency of 2 MHz and a diameter of 10 mm. This ultrasonic transducer is fixed to an installation table (not shown) that is movable vertically (distance Δz from the bottom surface) and horizontally (distance Δy from the axial center). In this comparative example, in order to grasp the flow of the entire cylindrical container, the ultrasonic transducer was moved at intervals of 10 mm over a height range from a height Δz=10 mm to a height Δz=110 mm from the bottom surface at distances Δy=0 mm and Δy=15 mm from the axial center, and, and the flow velocity profile was measured at each position.

Figure 10:
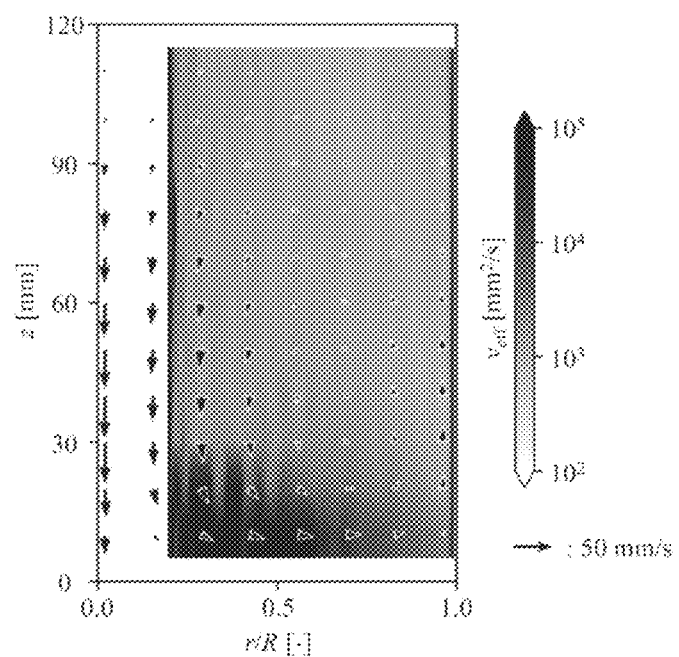
FIG. 10 is a color map and vector diagrams showing a flow velocity profile and a flow velocity vector in a cylindrical container in the conventional device in the present comparative example.

FIG. 10 is a measurement result showing an effective viscosity (color map) calculated from the flow velocity vector and flow velocity profile in the cylindrical container. The horizontal axis indicates a position obtained by making the distance r from the axial center of the cylindrical container to the cylindrical side wall dimensionless with the inner diameter R of the cylindrical container, and the vertical axis indicates a height z from the bottom surface.

The flow velocity vector is obtained by calculating the flow velocity in the vertical direction from the flow velocity in the radial direction measured at the position of the distance Δy=0 mm through an equation of continuity and then displaying the calculated flow velocity in the vertical direction in the form of vectors. The direction of an arrow represents a flow velocity direction, and the flow velocity is higher as the arrow is longer.

The color map shows the effective viscosity calculated from the flow velocity profile measured at the position of the distance Δy=15 mm. The effective viscosity is lower as the color is whiter, and the effective viscosity is higher as the color is darker. Note that flow velocity information (effective viscosity) is not obtained in the range of r/R<Δy/R≅0.2 because the ultrasonic transducer is placed at the distance Δy=15 mm from the axial center.

As shown in FIG. 10, the velocity vector indicates that the flow is not only in the radial direction, but also in the vertical direction. A radial flow from the axial center to the cylindrical wall surface which is caused by the difference in flow velocity between the axial center and the vicinity of the cylindrical wall surface is observed at the bottom surface. Along with this, a downward flow is generated in the vicinity of the axial center, and an upward flow is generated in the vicinity of the wall surface, so that a secondary flow is generated so as to circulate. Therefore, a doughnut-shaped secondary flow is generated in the cylindrical container as a whole. At this time, the secondary flow had a flow velocity of about 10 to 50 mm/s.

Silicone oil as a test fluid is a Newtonian fluid, and has a constant viscosity within the cylindrical container. However, as shown in the color map, the effective viscosity of the silicone oil was calculated to be high in the vicinity of the bottom surface of the cylindrical container, and was not constant. The reason for this is regarded as follows. The flow in the vicinity of the bottom surface is near to a flow when the bottom surface rotating reciprocatively forwards and backwards is substantially in a rigid body rotation state, which causes overestimation of the effective viscosity.

As described above, it has been confirmed in this comparative example that in the conventional device, the effective viscosity can be calculated based on the flow velocity profile, and a donut-shaped secondary flow occurs in the entire cylindrical container due to the flow in the radial direction generated in the vicinity of the bottom surface by rotating the bottomed cylindrical container. Further, the values of the physical properties could not be calculated accurately from the flow velocity profile measured in the vicinity of the bottom surface.

EXAMPLE 1

In Example 1, an ultrasonic physical properties measurement device according to the present invention (hereinafter referred to as "the device of the present invention") was fabricated, and the flow velocity profile in the cylinder was measured.

Figure 11:
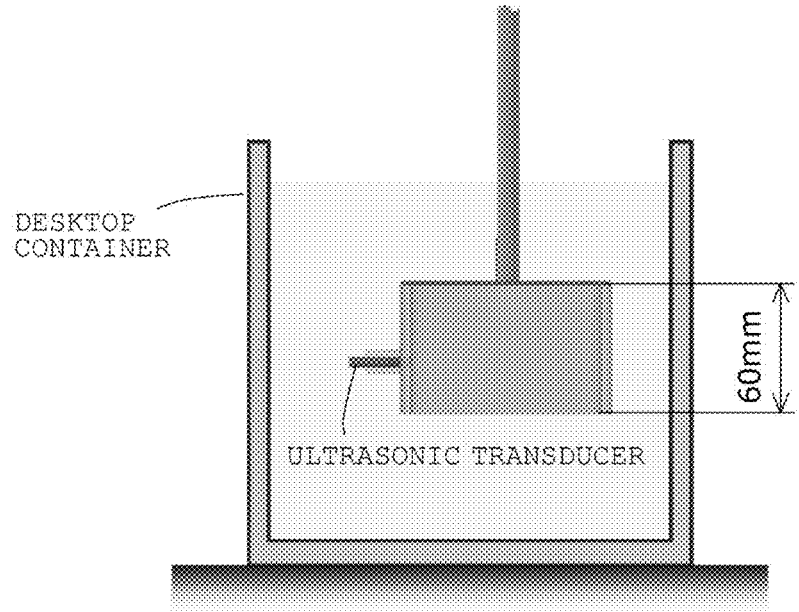
FIG. 11 is a schematic diagram showing an ultrasonic physical properties measurement device according to the present invention (a device according to the present invention) fabricated in Example 1, and a desktop container filled with liquid to be measured.

As shown in FIG. 11, the device of the present invention in Example 1 has a cylinder having an upper end plane and a lower end plane which are fully open. The cylinder is made of acrylic material, and has a thickness of 2 mm, a radius R of 77 mm, and a depth of 60 mm.

The support portion includes a rotating shaft as shown in FIGS. 2 and 5, a hub provided at the lower end portion of the rotating shaft, four spokes extending from base ends corresponding to four corners of the hub, and a fixing ring for connecting the tip of each of the spokes to the upper end of the cylinder. The rotating shaft has a diameter of 15 mm, and the hub is formed in a square shape having a side length of 45 mm. The spoke is formed in the shape of a flat-plate-like elongated rod having a width of 10 mm and a thickness of 5.5 mm, and is bent with respect to a line connecting the axial center and the base end. The power unit pivotally supports the rotating shaft at the upper end thereof.

An ultrasonic transducer having a frequency of 4 MHz and a diameter of 8 mm was used. This ultrasonic transducer is fixed at a position of a distance of Δy=15 mm from the axial center and a distance of 20 mm from the lower end plane on the outer side surface of the cylinder so as to be integrally rotatable with the cylinder. Further, in order to restrain noise caused by diffused reflection within the wall surface of the cylinder, the ultrasonic transducer was set so that the tip of the ultrasonic transducer could be located at a distance of about 8 mm from the inner peripheral surface of the cylinder (approximately the distance corresponding to the diameter of the ultrasonic transducer of 8 mm).

The liquid to be measured is silicone oil having a kinematic viscosity of 1000 mm²/s which is the same as in the comparative example, and microparticles manufactured by Mitsubishi Chemical Corporation are suspended as reflectors. This silicone oil was filled in a container placed on a table as shown in FIG. 11. Then, the entire cylinder supported by the support portion was placed in a state of being immersed in silicone oil in a tabletop container, and as in the comparative example, the cylinder was reciprocatively rotated forwards and backwards at 1 Hz in the angle range Θ of 90 degrees (π/2 rad).

Figure 12:
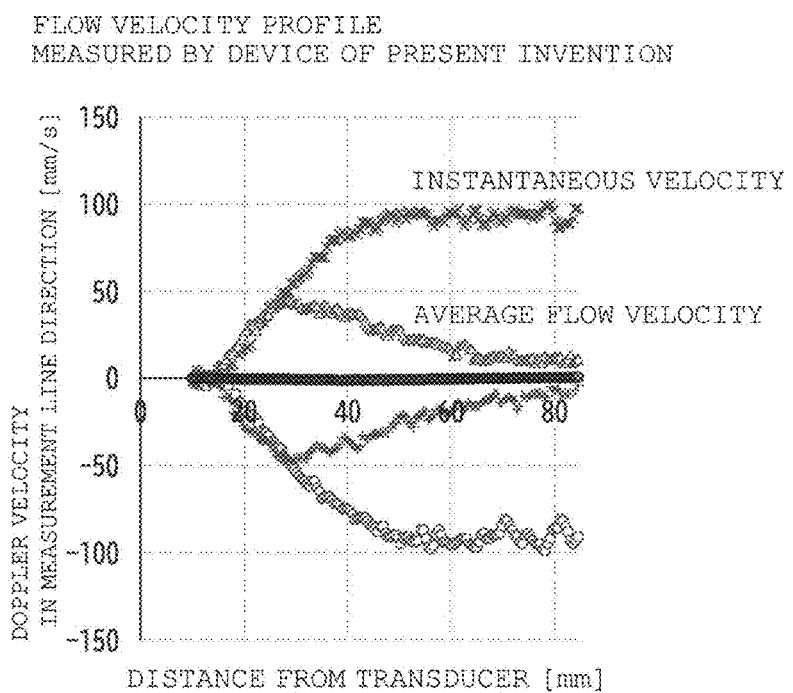
FIG. 12 is a graph showing instantaneous velocity profile and an average flow velocity profile in the cylinder which are measured by the device of the present invention in Example 1.

FIG. 12 shows the flow velocity profile of the silicone oil in the cylinder measured in Example 1. The horizontal axis represents the distance from the tip of the ultrasonic transducer. Here, the positional relationship between the axial center of the cylinder and the cylindrical side wall is left-right reversed from that in FIG. 10 described in the comparative example, the left side corresponding to the vicinity of the cylindrical side wall, and the right side corresponding to the vicinity of the axial center. Further, the vertical axis represents a measured flow velocity (Doppler velocity) in the direction of the measurement line, and shows instantaneous values at four times during one cycle of forward-and-backward reciprocating rotation and average values of the flow velocity measured at constant time intervals.

As shown in FIG. 12, the instantaneous flow velocity profile fluctuates symmetrically around the flow velocity of 0 mm/s. It is found that the forward-and-backward reciprocating rotation causes the liquid in the cylinder to flow forwards and backwards. Also, the average flow velocity profile is approximately 0 mm/s. If a flow velocity component (secondary flow) in the radial direction has occurred in the cylinder, the measured flow velocity fluctuates asymmetrically around the flow velocity of 0 mm/s, and the average flow velocity does not reach 0 mm/s.

From the above, it was confirmed that the device of the present invention of Example 1 could restrain the secondary flow as compared with the conventional device.

EXAMPLE 2

Next, flow velocity profiles measured by the conventional device of the comparative example and the ultrasonic physical properties measurement device according to the present invention of Example 1 were compared with each other to estimate an evaluable range that can be used for calculating physical properties.

Figure 13:
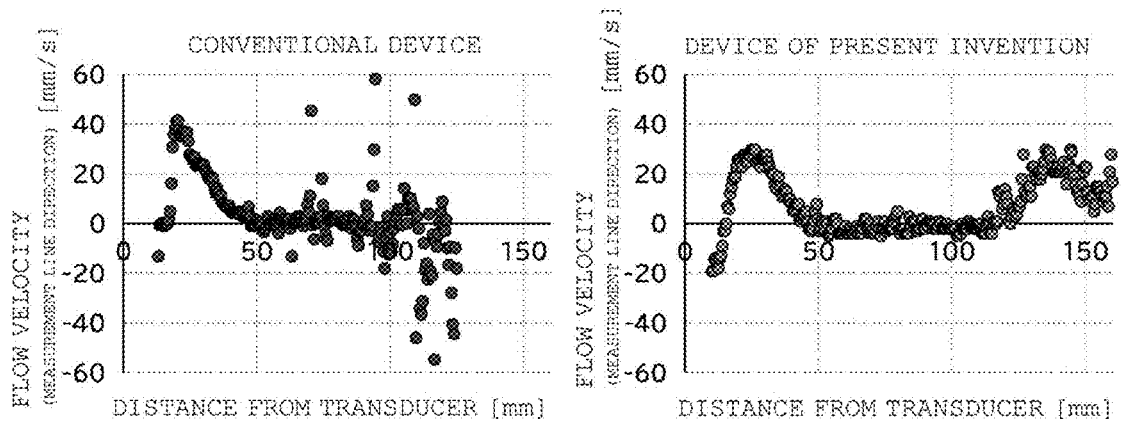
FIG. 13 is a graph in which instantaneous flow velocity profile at the same phase measured by a conventional device and the device of the present invention in Example 2.

FIG. 13 is a graph obtained by plotting instantaneous flow velocity profiles at the same phase in the instantaneous flow velocity profiles measured by forward-and-backward reciprocating rotation, and comparing the conventional device and the device of the present invention. A left-side graph shows a result of the conventional device, and a right-side graph shows a result of the device of the present invention. The horizontal and vertical axes are the same as those in FIG. 13, wherein the horizontal axis represents the distance from the tip of the ultrasonic transducer and the vertical axis represents the measured flow velocity in the direction of the measurement line.

As shown in the left-side graph, when the conventional device is used, the flow velocity profile comes to contain noise when the distance from the ultrasonic transducer reaches about 75 mm. As a factor, it is first considered that the silicone oil to be measured has a property of attenuating ultrasonic waves, and thus the reception amount of ultrasonic waves received becomes insufficient to measure the flow velocity as the distance increases, resulting in noise. As a second factor, it is considered that since the ultrasonic transducer is fixed at a position apart from the cylindrical container, ultrasonic waves emitted in water filled around the cylindrical container suffer diffused reflection or attenuation to cause noise while propagating through the wall surface of the cylindrical container to the silicone oil in the container. Further as a third factor, it is also considered that since the ultrasonic transducer and the cylindrical container have relative velocities, the flow velocity in the direction of the measurement line decreases as the distance from the ultrasonic transducer increases, and the number of the reflectors (microparticles) passing through the measurement line decreases, so that the reception amount of ultrasonic waves became insufficient.

On the other hand, as shown in the right-side graph, in the case of the device of the present invention, little noise is observed up to a distance of about 115 mm from the ultrasonic transducer, noise is slight even in the vicinity of the wall surface on the opposite side to the position where the ultrasonic transducer is placed (in the vicinity of the distance of 150 mm), and there appears little noise that deviates greatly from an assumed flow velocity profile. The reason for this is regarded as follows. Diffused reflection of ultrasonic waves is restrained by fixing the ultrasonic transducer to the cylinder, and the flow velocity of the liquid in the direction of the measurement line is higher as the distance from the ultrasonic transducer is closer to the axial center of the cylinder (longer), so that sufficient ultrasonic waves can be received even at positions where ultrasonic waves tend to attenuate, thereby restraining occurrence of noise. Therefore, the flow velocity is measured up to the vicinity of the wall surface, and it is expected that the physical properties under the actual situation can be calculated.

Therefore, an evaluable range with respect to the radial position of the cylindrical container and the cylinder have been examined. Here, the evaluable range is a range in which the physical properties can be calculated.

Figure 14:
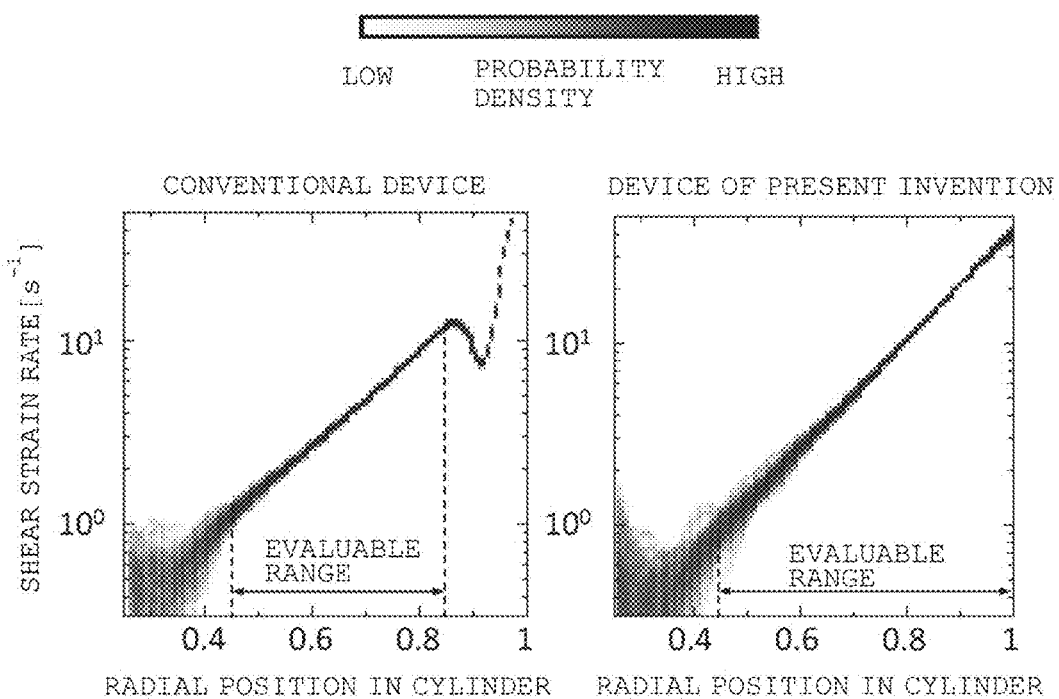
FIG. 14 is a graph showing radius distributions of shear strain rates calculated from the flow velocity profiles measured by the conventional device and the device of the present invention in Example 2.

FIG. 14 is a graph showing the shear strain rate with respect to the radial position of the cylindrical container and the cylinder. A left-side graph shows a result of the conventional device, and a right-side graph shows a result of the ultrasonic physical properties measurement device according to the present invention. Similarly to FIG. 10, the horizontal axis indicates a position obtained by making the distance r from the axial center of the cylindrical container to the cylindrical side wall dimensionless with the inner diameter R of the cylindrical container (the positional relationship between the axial center of the cylinder and the cylindrical side wall is left-right reversed between FIG. 12 and FIG. 13). The vertical axis indicates the shear strain rate, and the color indicates the probability density.

As shown in the left-side graph, in the case of the conventional device, the shear strain rate fluctuates in the range from the axial center (r/R=0) to r/R=0.45. This is probably because the rate gradient is small and the shear strain rate is small in the vicinity of the axial center, which causes fluctuation. Moreover, in a range exceeding r/R=0.85, it was confirmed that accurate measurement could not be performed because values which should be along a substantially straight line fluctuated.

On the other hand, as shown in the right-side graph, in the case of the device of the present invention, values are along a substantially straight line even in the range exceeding r/R=0.85, and accurate measurement could be performed.

Figure 15:
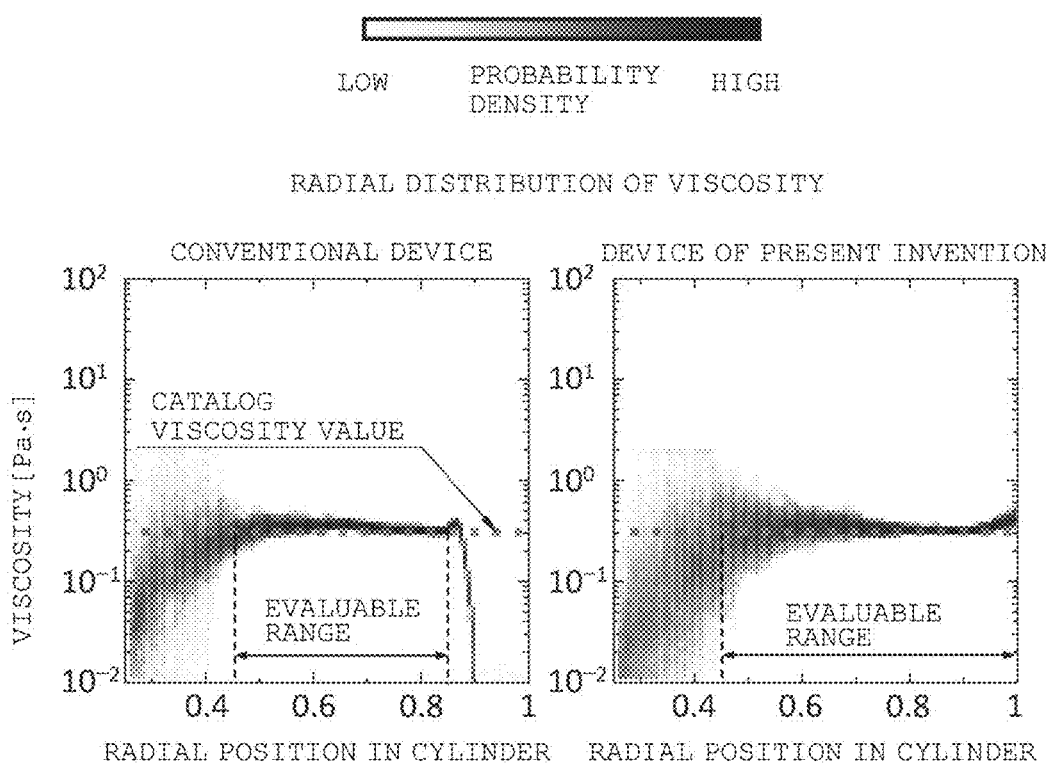
FIG. 15 is a graph showing radius distributions of viscosity calculated from the flow velocity profiles measured by the conventional device and the device of the present invention in Example 2.

FIG. 15 is a graph showing the viscosity calculated from the radial position of the cylindrical container and the cylindrical body and the flow velocity profile. Similarly to FIG. 14, the horizontal axis represents the position obtained by making the distance r from the axial center of the cylindrical container to the cylindrical side wall with the inner diameter R of the cylindrical container. The vertical axis represents the viscosity, and the color indicates the probability density.

As shown in the left-side graph, in the case of the conventional device, the viscosity in the range of r/R=0.45 to 0.85 in which the flow velocity profile seems to be accurately performed matches a viscosity value (catalog viscosity value) described in a catalog of silicone oil. On the other hand, the viscosity in a range exceeding r/R=0.85 greatly deviates from the catalog viscosity value, and an accurate viscosity cannot be calculated.

On the other hand, as shown in the right-side graph, in the case of the device of the present invention, the viscosity in the range from r/R=0.45 to r/R=1 which corresponds to the cylindrical side wall matches the catalog viscosity value, and an accurate viscosity is obtained.

As shown in FIGS. 14 and 15, the evaluable range of the conventional device is the range from r/R=0.45 to 0.85, whereas the evaluable range of the device of the present invention is extended to the range from r/R=0.45 to 1. The flow caused by the cylinder rotating reciprocatively forwards and backwards is based on the shear force with the wall surface, and it contributes to enhancement of the accuracy of the calculated physical properties by enabling accurate measurement of the flow velocity profile in the vicinity of the wall surface. Therefore, it is considered that the device of the present invention can enhance the accuracy as compared with the conventional device.

Figure 16:
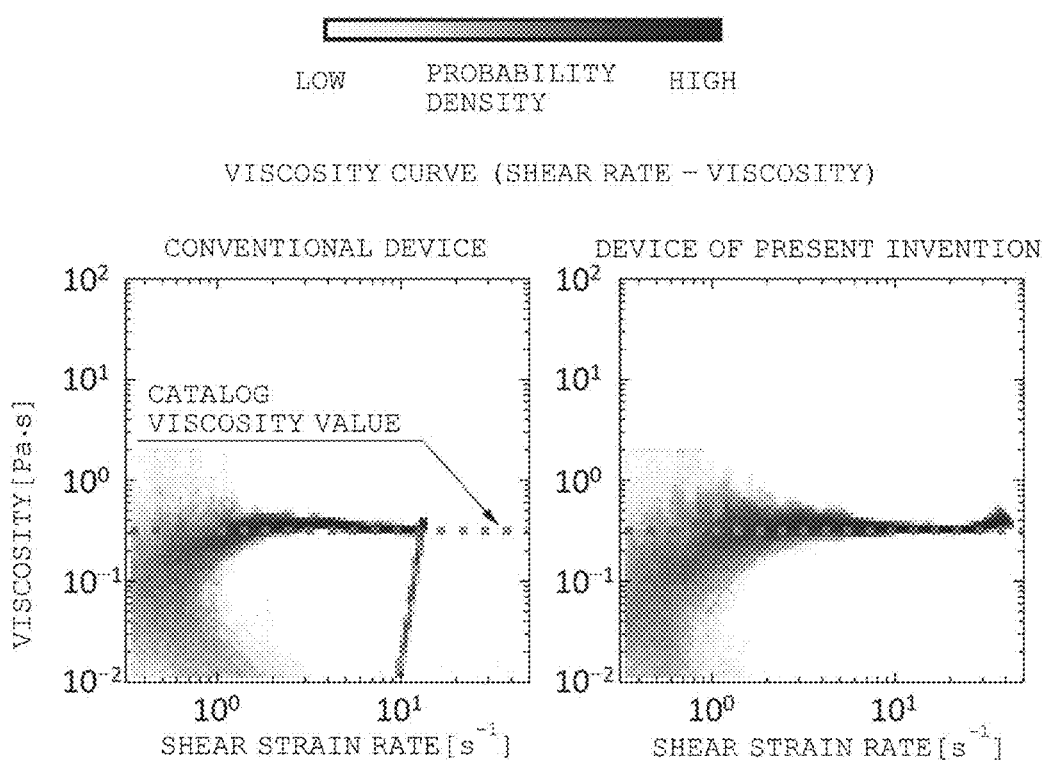
FIG. 16 is a graph showing viscosity curves calculated from the flow velocity profiles measured by the conventional device and the device of the present invention in Example 2.

FIG. 16 is a graph of a viscosity curve showing the relationship between the shear strain rate and the viscosity. A left-side graph shows a result of the conventional device, and a right-side graph shows a result of the device of the present invention. The horizontal axis represents the shear strain rate, and the vertical axis represents the viscosity. The color indicates the probability density.

As shown in the left-side graph, in the case of the conventional device, the measurement cannot be performed in a range where the shear strain rate exceeds about 10 s$^{-1}$. On the other hand, as shown in the right-side graph, in the case of the ultrasonic physical properties measurement device according to the present invention, even in the range where the shear strain rate exceeds about 10 s$^{-1}$, the viscosity value almost matches the catalog viscosity value, and accurate measurement can be performed.

Figure 17:
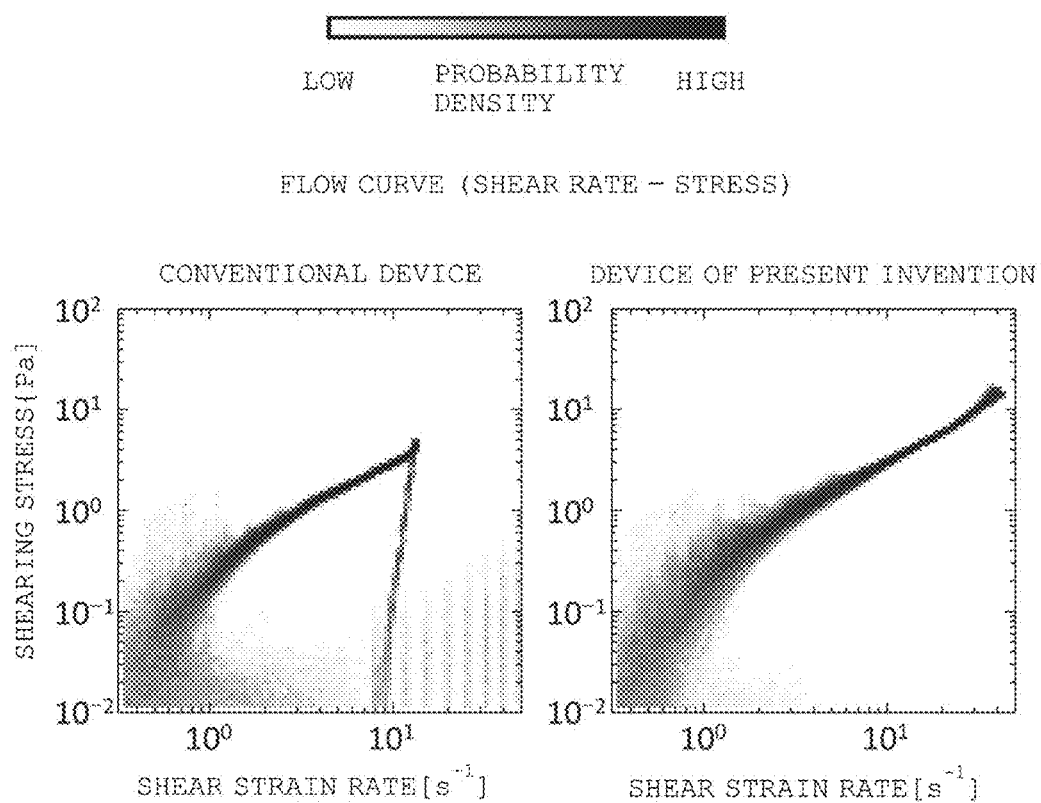
FIG. 17 is a graph showing flow curves calculated from the flow velocity profiles measured by the conventional device and the device of the present invention in Example 2.

FIG. 17 is a graph of a flow curve showing the relationship between a shear strain rate and a shearing stress. The horizontal axis represents the shear strain rate. The vertical axis represents the shearing stress, and the color indicates the probability density. The flow curve shows a flow characteristic obtained by measuring the viscosity in a certain state (steady flow state) in a plurality of shear rate ranges, and it is possible to estimate the shearing stress (viscosity) in various processes of different shear rate ranges.

The results are similar to those in FIG. 16, and as shown in the left-side graph, in the case of the conventional device, the measurement cannot be performed in a range where the shear strain rate exceeds about 10 s$^{-1}$. On the other hand, as shown in the right-side graph, in the case of the device of the present invention, the measurement can also be performed even in the range where the shear strain rate exceeded about 10 s$^{-1}$. ¥

Therefore, as shown in FIGS. 16 and 17, the device of the present invention can measure physical properties in a broader shear rate range than the conventional device.

From the above, the device of the present invention has a broader evaluation range than the conventional device and can calculate physical properties from the flow velocity in the vicinity of the wall, and the application range for the shear strain rate is also broad, so that the device of the present invention can measure the physical properties of liquids having various rheological characteristics.

EXAMPLE 3

Figure 18:
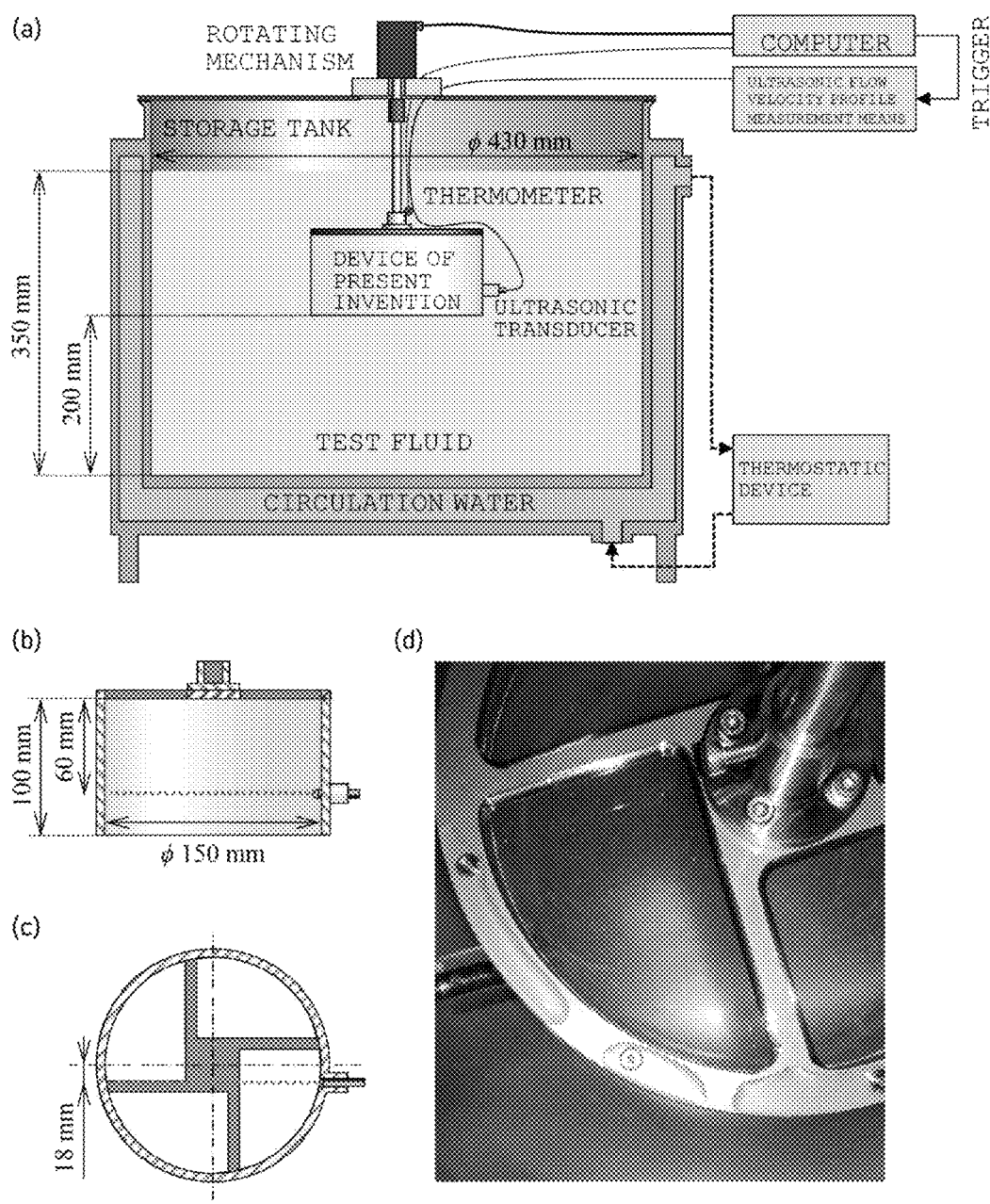
FIG. 18 is (a) a schematic diagram showing a measurement device, (b) a schematic diagram showing a cylinder, (c) a schematic diagram showing a support portion, and (d) a photograph of the support portion, which are used in Example 3.

Next, the temperature dependence of the viscosity characteristic (velocity profile) in a non-Newtonian fluid was measured by using the device of the present invention. As shown in FIG. 18(a), the device used in Example 3 has a storage tank which has a diameter of 430 mm and a depth of more than 350 mm for storing a test fluid, and the side surface and bottom surface of the storage tank are formed in a dual structure so that circulation water can flow therethrough. Further, a thermostatic device for circulating the circulation water and keeping the temperature constant is connected to the storage tank.

As shown in FIG. 18(b), the cylinder of the device of the present invention in Example 3 is made of acrylic material and has a thickness of 2 mm, a radius R of 77 mm, and a depth of 100 mm. Moreover, as shown in FIGS. 18(c) and 18(d), the support portion has the same configuration as that of the second embodiment. The cylinder is located at the center position of the storage tank such that the lower end thereof can be located at a distance of 200 mm from the bottom surface of the storage tank.

The ultrasonic transducer is fixed at a distance of Δy=18 mm from the axial center and a distance of 400 mm from the lower end plane on the outer surface of the cylinder so as to be rotatable integrally with the cylinder.

An aqueous solution of carboxymethyl cellulose as a non-Newtonian fluid was used as a test fluid. The concentration of carboxymethyl cellulose in the aqueous solution used in Example 3 is 0.5 wt %. This aqueous solution of carboxymethyl cellulose was stored up to a depth of 350 mm in the storage tank so that the cylinder could be completely submerged.

The circulation water was circulated in the storage tank by the thermostatic device to keep the temperature of the aqueous solution of carboxymethyl cellulose constant. In Example 3, measurements were performed at temperatures of 15° C., 20° C. and 25° C.

Figure 19:
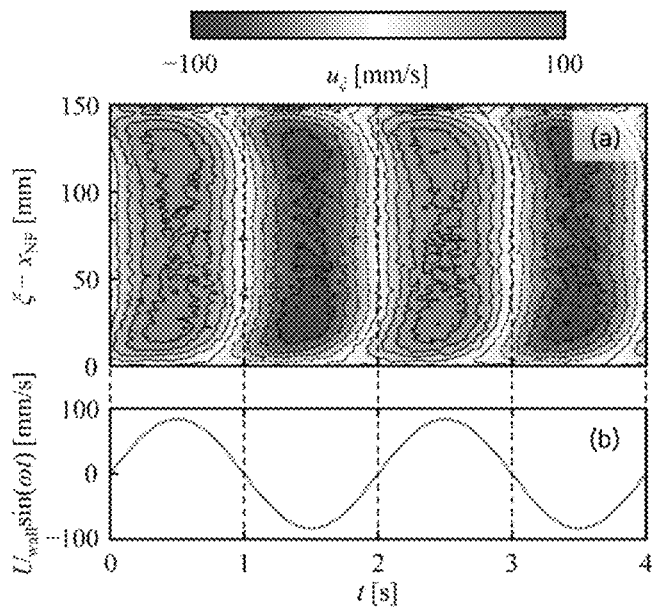
[FIG. 19] is a graph showing (a) a Doppler velocity profile (measured values) including the moving speed of an ultrasonic transducer which is obtained as a result of measuring an aqueous solution of carboxymethyl cellulose at a temperature of 15° C. in Example 3, and (b) the moving speed of the ultrasonic transducer.

FIG. 19 shows a result obtained by measuring an aqueous solution of carboxymethyl cellulose at a temperature of 15° C. using the device of the present invention. FIG. 19(a) shows a Doppler velocity measured by the ultrasonic transducer. The vertical axis represents the distance from the ultrasonic transducer, and the horizontal axis represents the lapse time. In addition, the shades of colors and contour lines represent the intensity of the Doppler velocity, and it is shown that the velocity is higher as the color is darker. Further, FIG. 19(b) shows the moving speed of the ultrasonic transducer (cylinder wall surface).

As shown in FIG. 19(a), the velocity in the vicinity of the wall surface (in the vicinity of 0 mm and in the vicinity of 150 mm on the vertical axis) and the velocity in the vicinity of the center of the cylinder (in the vicinity of 77 mm on the vertical axis) are slow. However, the Doppler velocity in FIG. 19(a) includes the moving speed of the ultrasonic transducer. Therefore, the difference between the Doppler velocity and the moving speed of the ultrasonic transducer shown in FIG. 19(b) was calculated to extract a Doppler velocity generated by the forward-and-backward reciprocating rotation of the cylinder. In addition, the calculated flow velocity profile in the circumferential direction of the Doppler velocity was normalized.

Figure 20:
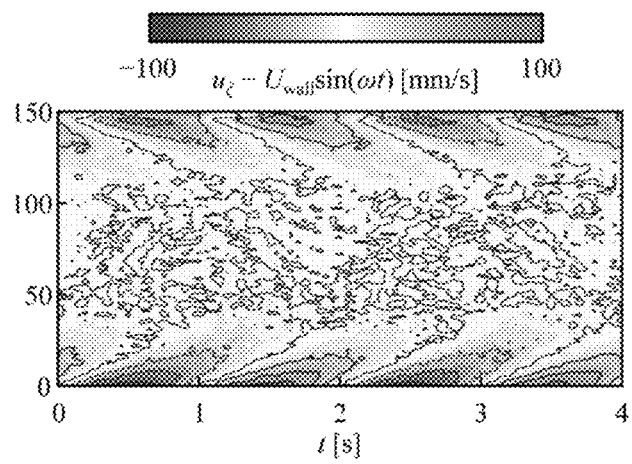
FIG. 20 is a graph showing a Doppler velocity profile obtained by subtracting the moving speed of the ultrasonic transducer from the Doppler velocity profile including the moving speed of the ultrasonic transducer as a result of measuring the aqueous solution of carboxymethyl cellulose at a temperature of 15° C. in Example 3.
Figure 21:
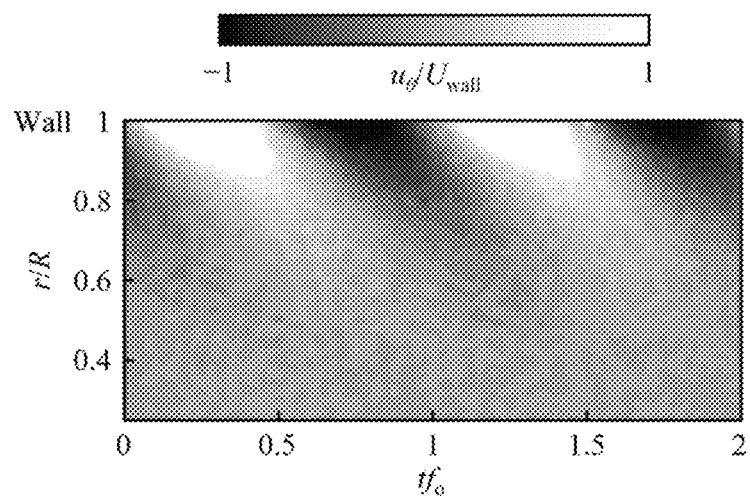
FIG. 21 is a graph showing a velocity profile in a circumferential direction flow obtained by normalizing the calculated Doppler velocity profile shown in FIG. 20 in Example 3.

FIG. 20 shows a Doppler velocity profile obtained by subtracting the moving speed of the ultrasonic transducer. FIG. 21 shows a flow velocity profile in the circumferential direction flow obtained by normalizing this Doppler velocity profile. As shown in FIGS. 20 and 21, the velocity profile appears like a stripe pattern such that the flow velocity is higher in the vicinity of the wall surface and repeats forward and reverse. It can also be seen that the stripes are slanted and the velocity gradually propagates in the direction to the center with the lapse of time. Therefore, it was confirmed that the device of the present invention could measure the flow velocity profile using an aqueous solution of carboxymethyl cellulose as a non-Newtonian fluid as a test fluid.

Figure 22:
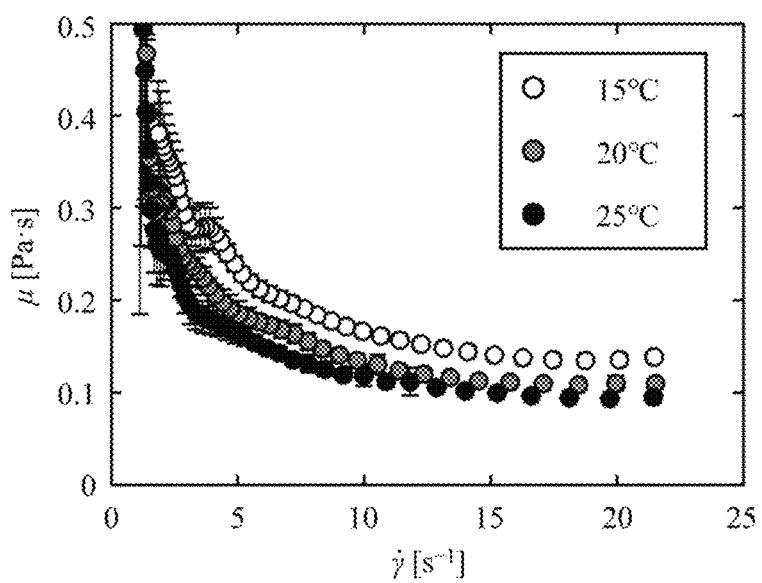
FIG. 22 is a graph showing viscosity curves calculated based on measurement results of the aqueous solution of carboxymethylcellulose at temperatures of 15° C., 20° C. and 25° C. in Example 3.

Next, the Doppler velocity was measured while the temperature of the aqueous solution of carboxymethyl cellulose was set to 15° C., 20° C. and 25° C., and the viscosity of the aqueous solution of carboxymethyl cellulose at each temperature was calculated. FIG. 22 shows viscosity curves calculated under the respective temperature conditions. The vertical axis represents viscosity, and the horizontal axis represents shear rate.

As shown in FIG. 22, the viscosity decreases as the shear rate increases under each temperature condition, and the characteristic of non-Newtonian fluids in which the viscosity changes depending on the shear rate appears.

Further, when the temperature of the aqueous solution of carboxymethyl cellulose increases, the viscosity tends to decrease with increase of the shear rate. In other words, the aqueous solution of carboxymethyl cellulose changed the viscosity characteristic as the temperature thereof increased, and brought a result in which the viscosity decreased from a stage where the shear rate was low.

As described above, the device of the present invention can measure the physical properties of fluids which are non-Newtonian fluids and have temperature dependence.

Note that the ultrasonic physical properties measurement device according to the present invention is not limited to the above-described embodiments, and can be modified as appropriate. For example, in order to increase the strength of the cylinder so that it will not deform due to forward-and-backward reciprocating rotation, it may be provided with a reinforcing material to be bridged on the upper end plane or the lower end plane to the extent that occurrence of a secondary flow is restrained as much as possible.

REFERENCE SIGNS LIST 1 ultrasonic physical properties measurement device
2 cylinder
3 rotating mechanism
4 ultrasonic flow velocity profile measurement means
5 physical properties calculation means
6 storage tank
21 upper end plane
22 lower end plane
23 transducer fixing portion
24 outer side surface
31 support portion
32 power unit
41 ultrasonic transducer
42 support arm
311 rotating shaft
312 hub
313 spokes
314 fixing ring
315 connecting hole

The invention claimed is:

1. An ultrasonic physical properties measurement device for measuring a flow velocity profile of a liquid flowing in a cylinder using ultrasonic waves by reciprocatively rotating the cylinder forwards and backwards in a constant cycle and calculating physical properties of the liquid from the flow velocity profile, wherein
an upper end plane and a lower end plane of the cylinder are perforated such that the liquid can flow therethrough, and the ultrasonic physical properties measurement device comprises a rotating mechanism for supporting the cylinder and reciprocatively rotating the cylinder forwards and backwards while a part or all of the cylinder is immersed in the liquid.

2. The ultrasonic physical properties measurement device according to claim 1, wherein
the upper end plane and the lower end plane of the cylinder are fully open, and
the rotating mechanism includes a rotating shaft to be pivotally supported by a power unit above an axial center of the cylinder as a support unit for supporting the cylinder, a hub fixed to a lower end portion of the rotating shaft, and a plurality of spokes that extend radially from the hub and are fixed to an upper edge portion of the cylinder.

3. The ultrasonic physical properties measurement device according to claim 2, wherein each of the spokes has a base end at a position that is horizontally displaced from a position of the axial center by a predetermined distance, and extends in a direction which is horizontal to a line connecting the axial center and the base end and bent at a predetermined angle with respect to the line.

4. The ultrasonic physical properties measurement device according to claim 1, wherein an ultrasonic transducer for radiating ultrasonic waves to an inside of the cylinder and receiving ultrasonic waves reflected from the inside of the cylinder is fixed to an outer side surface of the cylinder so as to be rotatable integrally with the cylinder.

* * * * *